United States Patent [19]

Weyers et al.

[11] Patent Number: 5,427,819
[45] Date of Patent: Jun. 27, 1995

[54] CORROSION INHIBITING REPAIR AND REHABILITATION TREATMENT PROCESS FOR REINFORCED CONCRETE STRUCTURES

[75] Inventors: Richard E. Weyers; Brian D. Prowell, both of Blacksburg, Va.

[73] Assignee: Virginia Tech Intellectual Properties, Inc., Blacksburg, Va.

[21] Appl. No.: 242,069

[22] Filed: May 13, 1994

Related U.S. Application Data

[63] Continuation of Ser. No. 974,954, Nov. 13, 1992, abandoned.

[51] Int. Cl.$^6$ ............................ B05D 5/00; B32B 35/00
[52] U.S. Cl. ...................................... 427/136; 427/140; 427/264; 427/265; 427/292; 427/384; 427/397.8; 427/403
[58] Field of Search ............... 427/136, 140, 292, 264, 427/265, 403, 384, 397.8

[56] References Cited

U.S. PATENT DOCUMENTS

| | | | |
|---|---|---|---|
| 1,558,783 | 10/1925 | Bleecker | 427/140 |
| 4,536,417 | 8/1985 | Shimizu | 427/140 |
| 4,559,241 | 12/1985 | Obitsu et al. | 427/140 |
| 4,931,314 | 6/1990 | Takakura et al. | 427/140 |
| 5,039,556 | 8/1991 | Cogliano et al. | 427/140 |

*Primary Examiner*—Janyce Bell
*Attorney, Agent, or Firm*—Whitham, Curtis, Whitham & McGinn

[57] ABSTRACT

A repair and rehabilitation treatment process for reinforced concrete structures involves the removal of concrete from above rebar or other metal reinforcement material in the concrete structure. After removal of concrete, the metal reinforcement materials are saturated with corrosion inhibiting agents. Saturation is best achieved by multiple spray applications of the corrosion inhibitor. The cavity in the concrete structure with the treated rebar or other metal reinforcement materials is then backfilled and/or overlaid with repair concrete. Preferably, the repair concrete includes corrosion inhibitors which will diffuse to the rebar over time or is a low permeability concrete that reduces the rate of diffusion of chloride corrosion causing agents to the rebar. The repair and rehabilitation process significantly increases the concrete structure's service life.

20 Claims, 1 Drawing Sheet

CORROSION INHIBITING REPAIR AND REHABILITATION TREATMENT PROCESS FOR REINFORCED CONCRETE STRUCTURES

This invention was made with U.S. Government support under SHRP-87-C103 awarded by the Strategic Highway Research Program. The U.S. government may have certain rights in this invention.

This application is a continuation of U.S. patent application Ser. No. 07/974,954 filed Nov. 13, 1992, now abandoned.

DESCRIPTION

Background of the Invention

1. Field of the Invention

The invention is generally related to processes for repairing reinforced concrete structures such as bridges, buildings, docks, piers, parking garages, and the like. More particularly, the invention is directed to a repair process which retards the corrosion of reinforcing metal (e.g., steel) in concrete.

2. Description of the Prior Art

Concrete structures, such as bridges, buildings, and docks, are typically reinforced with steel rebar, wire mesh, or coiled metal elements, for the purpose of providing the concrete structure with strength and rigidity. These concrete structures are expected to remain viable for many years despite the fact that they must withstand harsh environmental conditions. Corrosive agents are known to diffuse through concrete and to degrade reinforcing metals inside concrete structures, thereby reducing the strength of the structure. Chloride containing compounds are among the most destructive corrosive agents to metal reinforcing materials.

A common technique for repairing concrete bridge components and other structures which have deteriorated as a result of chloride induced corrosion of the reinforcing steel is to remove the unsound concrete, sandblast the exposed rebars to near white metal, and backfill the open cavity with shotcrete or cast-in-place concrete. The repaired component may then be overlaid (decks) or encased (beams, piers, piercaps, etc.) with a low permeable concrete. This technique has proved unsatisfactory for a variety of reasons. First, it is very difficult to remove all rust areas from the rebar by sandblasting. For example, because the sandblasting device cannot be positioned underneath the rebar, the rust areas in the sandblast shadow retain chloride contaminants. After backfilling, these chloride contaminants continue to corrode the rebar material, even if the rebar is covered with a low permeability concrete. Second, concrete surrounding a patch area in the concrete structure which is being repaired will be contaminated with chloride. Thus, chloride will diffuse from the non-repaired areas into the repair concrete and initiate new corrosion sites on the rebar. Third, the repair concrete itself may become exposed to chloride contaminants prior to or during backfilling, and these contaminants will initiate corrosion sites on the freshly cleaned rebar. Fourth, the repair area in the concrete structure can act as a cathode to the surrounding chloride contaminated areas, thereby accelerating corrosion in the surrounding areas. This is sometimes referred to as a "halo-effect".

Calcium nitrite has been used in the past as a corrosion inhibitor in concrete structures.

U.S. Pat. No. 3,427,175 to Angstadt et al. discloses a Portland cement composition which contains 0.1 to 10% calcium nitrite. While the Angstadt et al. patent is primarily directed to using calcium nitrite as an accelerator to reduce the hardening time or time of setting for the concrete, this patent points out that calcium nitrite inhibits corrosion of the metals placed in concrete as reinforcing bars. However, the Angstadt et al. patent does not discuss how inhibition of corrosion is achieved and does not recognize the need to immediately abate corrosion in a structure under repair.

U.S. Pat. No. 4,398,959 to Rosenberg et al. discloses a repair procedure wherein a calcium nitrite rich, latex modified mortar is used as an impermeable barier for the repair of corrosion damaged reinforced concrete structures. According to the Rosenberg et al. patent, the calcium nitrite will react with free lime to form a double salt of calcium nitrite-calciumhydroxide which will crystallize in the pores of the repair concrete, thereby reducing its permeability. As with Angstadt et al., the Rosenberg et al. patent fails to recognize the need for an immediate abatement of corrosion in progress at the repair site and does not discuss the role of calcium nitrite as a corrosion inhibitor on the surface of the steel rebar.

Manson et al., "Long-Term Rehabilitation of Salt Contaminated Bridge Decks," *National Cooperative Highway Research Program Report* 257, April, 1983, discusses several repair techniques for bridge decks, one of which involves the steps of scarification of the surface, application of an aqueous calcium nitrite solution, and then providing an overlay of low permeability concrete. The Manson et al. report failed to recognize that non-dried concrete, and concrete dried at low temperatures (180° F.), is able to absorb sufficient corrosion inhibitor to be beneficial to the mechanism(s) by which the corrosion process is abated by the corrosion inhibitors in the concrete. This is not a trivial matter. In the prior art, it was commonly believed that all water must be removed and a drying temperature criteria of 230° F. was used so that all the water would be boiled out of the pores in the concrete. Furthermore, Manson et al. did not recognize that the applied calcium nitrite solution could rapidly diffuse away from the rebar it was supposed to protect, and hence does not anticipate that saturation of the concrete surrounding the rebar with a corrosion inhibitor will provide superior results.

Some other methods have been developed for retarding the corrosion of steel in concrete. For example, cathodic protection, electrochemical chloride removal, and deep polymer impregnation techniques have been employed. However, these methods have been costly and complicated, and require the owner's personnel, construction firms, and workers to learn completely different techniques from the usual repair process.

SUMMARY OF THE INVENTION

It is an object of this invention to provide a repair process for reinforced concrete structures which substantially increases the service life of the repaired structure.

According to the invention, chloride contaminated concrete is removed from above the reinforcing metal (e.g., steel rebar). A corrosion inhibitor is then applied to the reinforcing steel and surrounding concrete. Application of the corrosion inhibitor is preferably performed by spraying to wet the reinforcing steel and to saturate the surrounding concrete. Saturation of the surrounding concrete with a corrosion inhibitor is achieved by several successive applications of the corrosion inhibitor. Two to four applications is generally suitable. Each application of the corrosion inhibitor is permitted to soak into the concrete and surround the reinforcing metal before a subsequent application of the corrosion inhibitor. Soak-in time periods are typically on the order of one to four hours, and are preferably one to two hours between spray applications. Care is taken to prevent the rebar and surrounding concrete from being exposed to water from rain and other sources during and after the corrosion inhibitor application process. A heat treatment process can be performed prior to the application of the corrosion inhibitors. After applying the corrosion inhibitors to the rebar, concrete fill or a concrete overlay is placed over top. The concrete fill or overlay concrete can include corrosion inhibitors or be a low permeability concrete, or a combination of the two. Having corrosion inhibitors in the fill or overlay concrete provides an in-situ reservoir of corrosion inhibitors for the rebar. Continuously, over time, corrosion inhibitors will diffuse from the repair concrete to the reinforcing elements and provide a maintenance level of corrosion inhibitor to prevent the initiation of new corrosion sites. Low permeability concrete significantly reduces the rate of diffusion of aggressive corrosion agents to the steel reinforcing materials.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
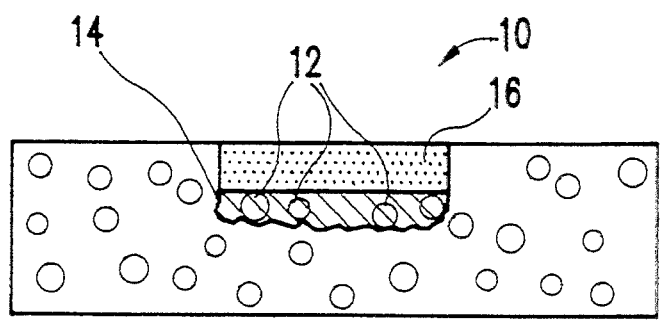
FIG. 1 is a cross-sectional side-view of a bridge deck repaired according to this invention.

In the repair process of this invention, chloride contaminated concrete only needs to be removed from above the reinforcing steel. This is the least expensive concrete to remove. By contrast, it is very expensive to remove concrete from between and below reinforcing steel in a reinforced concrete structure. Removal of the concrete can be accomplished by milling or pneumatic hamering. After the top layer of concrete is removed down to or near the level of the reinforcing steel or from around it (e.g., removal of concrete to within ¼ to one inch of the rebars is generally sufficient and it is not necessary to remove all concrete from the rebars), sandblasting or shotblasting can be used to remove loose material.

After removal of the concrete at the repair site, the steel reinforcing material (e.g., rebar, etc.) is saturated with a corrosion inhibitor. The corrosion inhibitor is selected to neutralize the chloride contaminants on the steel reinforcing material and to protect the surface of the steel reinforcing material so that the initiation and progression of corrosion on the steel reinforcing material is reduced. Many different corrosion inhibitor solutions can be used within the practice of this invention. Typical examples of corrosion inhibitors include Postrite, borate-salt, Cortec 2020, and Alox 901. Postrite is a liquid containing 15% calcium nitrite and is available from W. R. Grace Construction Products of Cambridge, Mass. Calcium nitrite has a direct corrosion inhibiting mechanism which reacts with the $Fe^{++}$ ions on the surface of the reinforcing steel according to the following reaction:

$$2 Fe^{++} + 2 OH^- + 2 NO_2 \rightarrow 2 NO \uparrow + Fe_2O_3 + H_2O$$

Cortec 2020 is a proprietary blend of surfactants and amine salts in a water carrier and is available from the Cortec Corporation of Minn. Alox 901 is a proprietary oxygenated hydrocarbon available from the Alox corporation of New York. Other solutions of calcium nitrite, borate-salt, amine salts or oxygenated hydrocarbons may also be suitable. Other nitrite salt solutions (e.g., sodium nitrite) might also be suitable.

The Postrite, borate-salt, and Cortec 2020 corrosion inhibitors are all water based. Alox 901 is applied as a 0.1 molar solution in denatured alcohol. All of the corrosion inhibitors are amenable to spray application. Spraying is the preferred technique for applying the corrosion inhibitor because it is simple for the construction workers to perform in the field; however, other techniques, such as painting, injecting, ponding (building a wall around the repair site and filling the area with a solution the corrosion inhibitor), etc., could be used. The coverage for the spray applied corrosion inhibitor depends on the nature of the inhibitor used. For example, Postrite is ideally applied at a rate of 150 square feet (sq. ft.) per gallon, Cortec 2020 is ideally applied at a rate of 225 sq. ft. per gallon, Alox 901 is ideally applied at a rate of 70 sq. ft. per gallon, and borate-salt water solution is ideally applied at a rate of 150 sq. ft. per gallon. These coverage areas can be varied by ten percent or more with acceptable results. Variation in the concentrations of the corrosion inhibitors will result in changes in the optimum coverage per gallon.

Wetting of the corroding reinforcement steel and saturating the surrounding concrete with the corrosion inhibitor is the primary objective since the corrosion inhibitor is responsible for immediately decreasing the rate of corrosion of the reinforcement steel. Furthermore, saturating the area with the corrosion inhibitor will significantly increase the time the inhibitor will remain effective around the steel reinforcing materials since it will increase the time it will take the corrosion inhibitor to diffuse away from the steel into concrete which does not contain the inhibitor. Therefore, several applications (e.g., three or four) of the corrosion inhibitor is preferred. After each spray application of corrosion inhibitor, construction personnel should allow one to four hours for the corrosion inhibitor to soak into the concrete and dry on the reinforcing steel before a subsequent application of the corrosion inhibitor.

Between each application of the corrosion inhibitor, care should be taken to prevent water and extraneous debris from contacting the repair site. Water poses the possible problem of washing out the inhibitor before the repair patch is placed. If water does wet the area under repair before the corrosion inhibiting treatment process is completed, the treated concrete surface should be dried before the next application of the corrosion inhibitor. A suitable technique for drying would be to use a propane fired infrared heater using a surface temperature of 400° F. Heating may be performed for thirty minutes or more.

To increase the effectiveness of the corrosion inhibiting treatment process, after the surface of the concrete is removed, the concrete surface can be dried with a propane fired infrared heater using a surface temperature of 300° F. to 500° F. until the temperature just below (0.5–1 inch) the reinforcing steel reaches 180° F. The heaters are turned off and the temperature of the concrete is allowed to cool slowly down to 100° F. Slow cooling is best achieved by laying a six inch layer of fiberglass insulation over the heated area during cooling. Once the concrete reaches 100° F. the spray-on applications of corrosion inhibitor should begin immediately. The heat treatment will drive off the free moisture in the concrete and improve the absorption of the inhibitor. 180° F. is the optimum drying temperature to improve absorption. It is important that the concrete be allowed to cool slowly in order to prevent thermal cracking.

After the final application of corrosion inhibitor has soaked into the repair site cavity, repair concrete is backfilled into the cavity. A light sand blasting step can be performed to remove residual corrosion inhibitor solution prior to placing the repair concrete in the cavity. Both Cortec 2020 and Alox 901 have detrimental affects on the bond strength between the substrate and repair concrete. Adequate bond strength is important to insure that freeze-thaw action and traffic loadings will not separate (delaminate) repair concrete from the substrate concrete. Sandblasting after the application of the inhibitors removes surface residues and provides an adequate bond.

It is advantageous to backfill and overlay with a concrete mixture which includes a corrosion inhibitor. Suitable concrete admixtures include DCI, which is a water-based liquid that contains about 30% calcium nitrite which is available from W. R. Grace Construction Products of Cambridge, Mass., Cortec 2000, which is a concrete corrosion admixture containing a migrating corrosion inhibitor available from the Cortec Corporation of Minnesota, and borate salt. Other admixtures containing nitrite salts (e.g., calcium nitrite), borate salt, amine-salts, alkanolamines, or esters may also be suitable. The corrosion inhibitor is added to the concrete mix (e.g., portland cement, admixtures and aggregate) prior to preparing the concrete for placement in the cavity or overlaying. Selection of a suitable concrete admixture depends on the corrosion inhibitor applied during the spray application process. This is because the method of inhibition varies from inhibitor to inhibitor. For example, if the Postrite (calcium nitrite) solution is used during spray application, DCI should be used as the admixture, if Cortec 2020 is used during spray application, Cortec 2000 should be used as the admixture, and if borate salt water solution is used during spray application, borate salt should be used as the admixture. The concrete admixture is generally less than 2% solids to portland cement solids by weight of the concrete mixture. For example, 2% calcium nitrite to portland cement solids is suitable when using DCI admixture. Including a corrosion inhibitor within the repair concrete provides a reservoir of corrosion inhibitor for the reinforcement steel. In particular, a maintenance level of a corrosion inhibitor is continuously supplied by the diffusion of the corrosion inhibitor to the reinforcing steel during the service life of the concrete structure. In addition, since the patch concrete includes an amount of the corrosion inhibitor, the rate of diffusion of the spray applied corrosion inhibitor away from the steel rebar and into the patch concrete will be reduced relative to when the patch concrete does not contain the corrosion inhibitor.

As an alternative, the corrosion inhibitor treated reinforcing steel could be covered or overlaid with a low permeable concrete. Typical examples of low permeable concrete include latex modified concrete, low slump dense concrete, gunnite, shot-crete, and micro-silica modified concrete. The low permeable concrete would significantly reduce the rate of diffusion of aggressive corrosion causing agents to the rebar or other reinforcing material (i.e., reduces backward diffusion).

In addition, a low permeable concrete could be applied over a concrete which contains a corrosion inhibitor admixture to obtain the benefits of both types of backfilling operations, or a low permeable concrete modified with a corrosion inhibitor admixture could be used.

Prior to placement of the repair concrete, a grout, which can be simply prepared by brushing the coarse aggregate out of the repair concrete, may be placed on the repair cavity or treated surface to be overlaid in order to improve the bond between the repair and substrate concrete. After placement, the repair concrete should be allowed to moist cure for a suitable length of time. Moist curing produces more impermeable concrete and will help prevent drying shrinkage cracking. In typical repair projects, moist curing for five to seven days should be sufficient. A penetrating sealer should be applied to the repair areas after drying in accordance with the manufacturer's instructions. Suitable sealers include the following: silanes, siloxanes, and blends including silanes and siloxanes.

The repair and rehabilitation process has been performed in the laboratory and in the field with good results. Examples 1–6 describe the laboratory and field application procedures and results.

EXAMPLE 1

Initial corrosion inhibitor evaluations were carried out on 1 ft * 1 ft reinforced concrete specimens. Specimens were cast containing one or two triads of reinforcing steel (rebar). After initial curing, the specimens were alternately ponded with a 6% by weight salt water solution (NaCl) and allowed to air dry to induce corrosion.

After the initiation of corrosion, the cover concrete was removed to the bar level and the specimen was surface ponded with one of the inhibitors (Postrite, Cortec 2020, Alox 901, and borate salt water solution). Specimens were ponded for varying lengths of time, and some specimens were dried prior to ponding. The treatments were applied to groups of specimens with different degrees of corrosion. After the ponding period, an inhibitor modified concrete overlay was applied to the specimen. The performance of the treated specimens was monitored with a linear polarization device which measures the rate of corrosion and the performance compared favorably to untreated specimens.

EXAMPLE 2

The surface ponding technique used in the small scale specimens would be difficult and expensive under field conditions. Therefore, experiments with spray applications of the corrosion inhibitors were performed. In the experiments, the surface applied corrosion inhibitors were sprayed on 4 ft * 4 ft (16 sq. ft.) slabs using a ½ gallon garden sprayer. Three equal spray applications were applied to the slab, the second application was applied ½ hour and the third, 12 hours after the initial spraying. The application rates were determined by spraying the surface until it appeared to be uniformly saturated, and then dividing the area of the slab by the volume of inhibitor used.

EXAMPLE 3

Concrete from a damaged section of a bridge is removed down to the rebar and the rebar is lightly sandblasted. Postrite from W. R. Grace Construction Products (15% calcium nitrite solution) is applied to the exposed rebar by spraying at a rate of 150 square feet per gallon. After the first application of the Postrite has soaked in, determined by a dry appearance of the concrete and the expiration of one to four hours, a second application of Postrite is made. After the second application has soaked in, a third application is made. Upon soaking in of the third application, the cavity is back filled with an overlay containing the concrete and DCI admixture at a rate of four gallons per cubic yard of concrete. Upon curing, the concrete surface is treated with a penetrating sealer. FIG. 1 illustrates the repair process and shows a cross-sectional view of a bridge deck repair site 10 where the rebars 12 are surrounded by a concrete region 14 saturated with spray applied Postrite and the repair site 10 is filled with a concrete 16 containing a DCI admixture.

EXAMPLE 4

Concrete from a damaged section of a bridge is removed down to the rebar and the rebar is lightly sandblasted. Cortec 2020 is applied to the rebar at a rate of 225 sq. ft. per gallon. A second and third application of Cortec 2020 are applied as in Example 3 above. Residual Cortec 2020 is removed from the concrete cavity or surface to be overlaid by light sandblasting. The cavity is backfilled with concrete containing one pint per cubic yard Cortec 2000. A sealer is applied to the concrete after curing.

As a comparison to this process, tests have shown that including an inhibitor in the overlaid concreme alone does not abate the corrosion process. In the tests, one half a bridge deck was repaired with a low-slump dense concrete overlay. The other half of the bridge was repaired with a plain low-slump dense concrete overlay. Several years later, a corrosion assessment was conducted on the decks. The assessment included: a physical damage survey, cover depth corrosion survey, chloride content survey, corrosion potential survey, and corrosion rate survey. The results of the physical damage survey and corrosion rate survey indicated a greater degree of deterioration on the untreated side, and the corrosion potentials, a measure of the likelihood of active corrosion, was also greater on the untreated side. However, the mean cover depth was 0.3 inches greater on the treated half of the deck. The corresponding chloride contents at the bar level were 2.5 times greater on the untreated side. The mean chloride contents were less than the critical contamination level (1.2 lbs/yd$^3$) on the treated half, and greater than the critical contamination level on the untreated side. The corrosion rates were essentially identical on both halves of the bridge. Though the physical damage surveys and corrosion potentials would seem to indicate that the corrosion inhibitor was successful in abating the corrosion of the reinforcing steel, the difference in performance is better explained by the differences in cover depth and chloride content.

EXAMPLE 5

Concrete from a damaged section of a bridge is removed down to the rebar. Alox 901 solution is applied to the rebar at a rate of 70 sq. ft. per gallon. The Alox 901 solution is a 0.1 molar solution of Alox 901 dissolved in denatured alcohol. Second and third applications of Alox 901 are applied as in Example 3 above. After the application of the Alox 901, the repair cavity concrete is lightly sandblasted. Latex modified concrete, a concrete with low permeability, is backfilled into the repair cavity and allowed to cure. The cured concrete is treated with a sealer.

EXAMPLE 6

Figure 2:
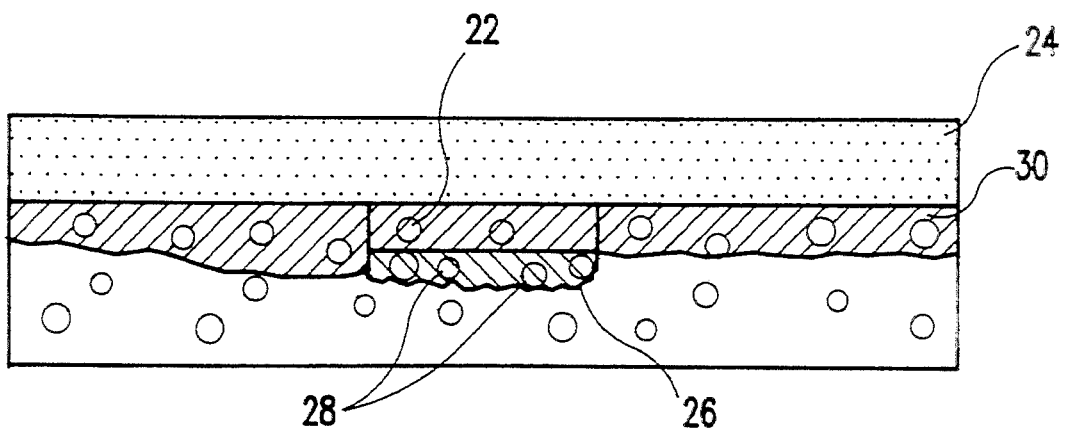
FIG. 2 is a cross-sectional side-view of a bridge deck repaired using to a two-part spray application procedure.

The cover concrete of a damaged reinforced concrete bridge deck or similar reinforced flatwork component is milled to the depth of the reinforcement steel. Any areas of unsound concrete around the reinforcement steel are removed using a pneumatic hammer. Before proceeding further, these areas can be repaired directly using the procedure of Example 3. Subsequently, a corrosion inhibitor is sprayed on the entire flatwork surface (e.g., deck) at the rate specified above. Several applications are made to saturate the concrete surrounding the rebars at the flatwork surface. Finally, an overlay containing a corrosion inhbitor admixture is applied over the entire flatwork as is set forth in Example 3. FIG. 2 illustrates this two step approach where area 22 is first repaired before the deck overlay 24 is added. Note the concrete 26 surrounding the rebars 28 is first saturated with the sprayed on corrosion inhibitor and the area 22 is filled with a concrete containing the corrosion inhibitor admixture. Subsequently, the entire deck surface is spray saturated with corrosion inhibitor to saturate area 30 with corrosion inhibitor prior to the application of overlay 24 which also contains a corrosion inhibitor admixture.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A repair and rehabilitation process for reinforced concrete structures, comprising the steps of:
    removing concrete overlying metal reinforcement materials at a repair site in a concrete structure, said removing step leaving concrete surrounding said metal reinforcement material;
    saturating said concrete surrounding said metal reinforcement material with a corrosion inhibitor solution to form a concrete region saturated with corrosion inhibitor, said corrosion inhibitor solution being specific for chloride induced corrosion and selected from the group consisting of nitrite salts, borate salts, amine salts, and oxygenated hydrocarbons; and
    applying over said concrete region saturated with corrosion inhibitor either a low permeable concrete or a concrete containing a corrosion inhibitor admixture specific for chloride induced corrosion selected from the group consisting of nitrite salts, borate salts, amine salts, and oxygenated hydrocarbons, wherein if said concrete containing said corrosion inhibitor admixture is applied during said applying step, the same corrosion inhibitor will be used in said corrosion inhibitor solution that is used to saturate said concrete region in said saturating step and in said corrosion inhibitor admixture for said concrete.

2. A repair and rehabilitation process as recited in claim 1 wherein said step of saturating is performed by spraying said corrosion inhibitor solution on said repair site after said step of removing.

3. A repair and rehabilitation process as recited in claim 2 wherein said step of saturating includes multiple spray applications of said corrosion inhibitor solution, each of said multiple spray applications being followed by a period sufficient for said corrosion inhibitor solution to soak into said concrete structure.

4. A repair and rehabilitation process as recited in claim 1 wherein said corrosion inhibitor used in said saturating step is a nitrite salt.

5. A repair and rehabilitation process as recited in claim 4 wherein said nitrite salt is calcium nitrite.

6. A repair and rehabilitation process as recited in claim 1 wherein said corrosion inhibitor used in said saturating step is a borate salt.

7. A repair and rehabilitation process as recited in claim 1 wherein said corrosion inhibitor used in said saturating step is an amine salt.

8. A repair and rehabilitation process as recited in claim 1 wherein said corrosion inhibitor used in said saturating step is an oxygenated hydrocarbons.

9. A repair and rehabilitation process as recited in claim 1 wherein said step of applying utilizes a concrete containing a corrosion inhibitor admixture.

10. A repair and rehabilitation process as recited in claim 9 wherein said corrosion inhibitor admixture is a nitrite salt.

11. A repair and rehabilitation process as recited in claim 10 wherein said nitrite salt is calcium nitrite.

12. A repair and rehabilitation process as recited in claim 9 wherein said corrosion inhibitor admixture is a borate salt.

13. A repair and rehabilitation process as recited in claim 9 wherein said corrosion inhibitor admixture includes an amine-salt.

14. A repair and rehabilitation process as recited in claim 9 wherein said corrosion inhibitor admixture includes oxygenated hydrocarbons.

15. A repair and rehabilitation process as recited in claim 1 wherein said step of applying utilizes a low permeable concrete.

16. A repair and rehabilitation process as recited in claim 15 wherein said low permeable concrete is selected from the group consisting of latex modified concrete, gunnite, shot-crete, micro-silica modified concrete, and low slump dense concrete.

17. A repair and rehabilitation process as recited in claim 1 further comprising the steps of curing said low permeable concrete or said concrete containing said corrosion inhibitor admixture, and applying a sealer at said repair site.

18. A repair and rehabilitation process as recited in claim 1 further comprising the steps of heating said concrete structure at said repair site to 180° F., and slowly cooling said concrete structure at said repair site, said steps of heating and slowly cooling being performed prior to said step of saturating.

19. A repair and rehabilitation process as recited in claim 1 further comprising the steps of determining if water has wetted said repair site after said step of removing, and drying said water from said repair site.

20. A repair and rehabilitation process of a concrete structure with reinforced decking, including bridges, docks, piers, and parking garates, comprising the steps of:

removing concrete overlying metal reinforcement materials in said concrete structure with reinforced decking, said removing step leaving concrete surrounding the metal reinforcement material;

filling open cavities in said concrete structure with a concrete including a corrosion inhibitor admixture where damaged concrete has been removed;

saturating said concrete surrounding said metal reinforcement materials of said concrete structure after said removing step with a corrosion inhibitor solution to form a conrete region saturated with corrosion inhibitor, said corrosion inhibitor solution being specific for chloride induced corrosion and selected from the group consisting of nitrite salts, borate salts, amine salts, and oxygenated hydrocarbons; and applying either a low permeable concrete or said concrete containing a corrosion inhibitor admixture specific for chloride induced corrosion selected from the group consisting of nitrite salts, borate salts, amine salts, and oxygenated hydrocarbons, over said metal reinforcement materials of said concrete structure at said concrete region saturated with corrosion inhibitor, wherein if said concrete containing said corrosion inhibitor is applied during said applying step, the same corrosion inhibitor will be used in said corrosion inhibitor solution that is used to saturate said concrete region in said saturating step and in said corrosion inhibitor admixture for said concrete.

* * * * *